June 24, 1930. J. HERMAN 1,765,585
SET FOR MEASURING OPERATING TIME OF RELAYS
Filed Sept. 21, 1926
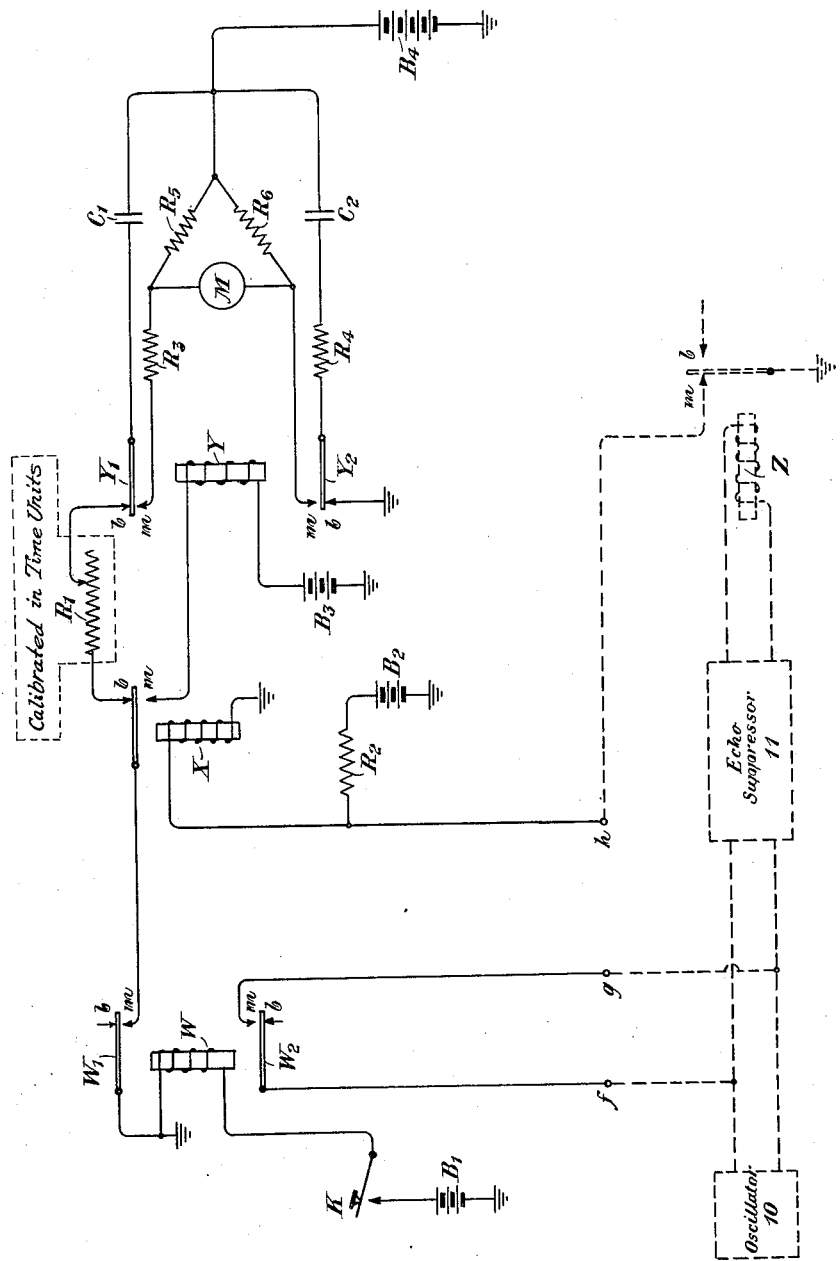
INVENTOR.
J. Herman
BY
ATTORNEYS.

Patented June 24, 1930

1,765,585

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

SET FOR MEASURING OPERATING TIME OF RELAYS

Application filed September 21, 1926. Serial No. 136,887.

This invention relates to testing or measuring sets for electrical circuits and more particularly to improved arrangements for measuring the elapsed time between the application or removal of a voltage to a circuit and the operation of an electrical or mechanical device, such as a relay, in said circuit.

The operation of the testing or measuring device of this invention depends merely upon repeatedly opening and closing a key and obtaining a condition of balance as indicated by a meter. The condition of balance is secured by turning one or more dials, which may be calibrated in intervals of time. Variations in battery voltage have no effect upon the calibration which is dependent only upon the values of certain capacities and resistances in the device. Accordingly, the measuring set includes two condensers which are charged from a common battery during the interval of time which is being measured. One of the condensers is charged through a high resistance and the charge accumulated on it is an accurate measure of the interval of time during which the charging takes place. The second condenser is smaller in capacity than the first and is charged through a comparatively low resistance. Consequently, the second condenser acquires its full charge almost instantly.

After the completion of the charging interval, the two condensers are discharged simultaneously through a differential meter. If the two charges are equal, the meter will show no deflection. If they are unequal, the meter will show a momentary deflection. By repeating the charging and discharging process a number of times and adjusting the value of the high resistance in series with the first condenser, the charges on the two condensers can be made equal. When this condition has been obtained, the interval of time during which the charging took place may be obtained from the value of the high resistance as indicated by the calibrations associated therewith.

A straight-line relationship exists between the interval of time during which charging takes place and the value of resistance required to make the charges on the two condensers equal. Consequently, it is possible to calibrate the dials associated with the high resistance in fractions of a second, since a certain value of resistance always corresponds to a definite interval of time for particular values of the two condensers. In practice, it will probably be desirable to provide the high resistance on several dials, each dial having ten steps. The resistances may be so chosen that one dial will read ten-thousandths of a second, the next dial thousandths of a second, the next hundredths, the next tenths, etc. Further features of the arrangements of the invention will appear more fully from the detailed description thereof hereinafter given.

The invention may be more fully understood from the following description together with the accompanying drawing in which is shown a circuit diagram embodying the invention.

The measuring set comprises the two condensers $C_1$ and $C_2$. The high resistance $R_1$ which may be varied by calibrated dials is associated with condenser $C_1$. The condensers $C_1$ and $C_2$ may be discharged by the switching relay Y through the differential meter M. The set also includes the switching relays X and W and is shown connected to a circuit including an echo suppressor 11 in order to measure the releasing time of a relay Z associated therewith. It is understood that this is for purposes of illustration only and that the measuring or testing device of this invention may be utilized with many other types of circuits.

When the key K of the measuring set is closed, the two armatures $W_1$ and $W_2$ of relay W move to their $m$ contacts due to the operation of the relay by the battery $B_1$. The two relay armatures and associated $m$ contacts are so adjusted that they close their respective circuits at practically the same instant. Armature $W_2$ short circuits the oscillator 10 which is connected to the input of the echo suppressor and thereby initiating the release of relay Z. Armature $W_1$ connects a ground to the armature and $b$ contact of relay X, thereby beginning the charging of the condenser $C_1$ from the battery $B_4$ through the armature $Y_1$ and $b$ contact of relay Y and through the high resistance $R_1$ the condenser $C_2$ has already been charged fully from this battery due to the connection to ground through the $b$ contact of armature $Y_2$ of relay Y. Conditions described so far remain unchanged until relay Z releases.

When relay Z releases it removes the ground from its $m$ contact thereby removing the short circuit across the winding of relay X and allowing the latter relay to be operated by the battery $B_2$. The operation of the armature of relay X away from its $b$ contact opens the charging circuit of condenser $C_1$ and stops the charging.

When the armature of relay X reaches its $m$ contact, a ground is connected to the winding of relay Y thereby causing the operation of this relay by battery $B_3$. The two armatures $Y_1$ and $Y_2$ of relay Y move to their $m$ contacts and discharge the two condensers $C_1$ and $C_2$ through the differential meter circuit composed of the meter M and the two equal resistances $R_5$ and $R_6$. Additional resistances $R_3$ and $R_4$ are connected into the discharge circuit to limit the discharge current and prevent sparking at the relay contacts.

In order to prevent a quick double deflection of the meter when a balance has been reached, it is necessary that the time constant of the two branches of the discharge circuit be about the same. For this reason, the ratio $R_4$ to $R_3$ of the two discharge resistances should be approximately the same as the ratio $C_1$ to $C_2$ of the two condensers.

If the meter shows no deflection at the instant of discharge, it indicates that the two charges are equal and that the releasing time of relay Z is that indicated by the value of the resistance $R_1$. If the meter shows a deflection, the key K should be opened and closed repeatedly and the resistance $R_1$ adjusted until the meter shows no deflection.

It is evident that the set can be arranged so that the $m$ contact and armature $W_2$ of relay W connect the oscillator 10 to the echo suppressor 11 instead of short circuiting it; also that the armature and $m$ contact of relay Z closes the operating circuit of relay X instead of short circuiting the winding.

With such an arrangement, the set will measure the operating instead of releasing time of relay Z. It should also be evident that a battery may be substituted for the oscillator, in which case the set would be suitable for measuring the operating and releasing time of a relay or a train of relays in a direct current circuit instead of in the vacuum tube detector circuit.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. The combination with an electrical circuit including a source of voltage and a responsive device operated thereby of a testing set for measuring the time intervals in the operation of said responsive device, said testing set comprising a short circuit across said electrical circuit, two condensers, separate charging circuits for said condensers, a variable resistance included in the charging circuit of one of said condensers, manually controlled switching means for closing the charging circuits of said condensers and for controlling the short circuit across said electrical circuit, and means controlled by said responsive device for simultaneously discharging said condensers through a differential meter.

2. The combination with an electrical circuit including a source of voltage and a responsive device operated thereby of a testing set for measuring the time intervals in the operation of said responsive device, said testing set comprising two condensers, separate charging circuits for said condensers, a variable resistance included in the charging circuit of one of said condensers, switching means for closing said last mentioned charging circuit and for controlling the association of said source of voltage with said responsive device, a differential meter, and means controlled by said responsive device for simultaneously discharging said condensers through said differential meter.

3. The combination with an electrical circuit including a source of voltage and a responsive device operated thereby of a testing set for measuring the time intervals in the operation of said responsive device, said testing set comprising two condensers, separate charging circuits for said condensers, a variable resistance included in the charging circuit of one of said condensers, indicating mechanism calibrated in units of time controlled by said variable resistance, switching means for simultaneously closing said last mentioned charging circuit and for controlling the association of said source of voltage with said indicating device, separate discharge circuits for said condensers, a differential meter associated with said discharge circuits, and switching means controlled by said responsive device for simultaneously closing said discharge circuits.

4. A device for measuring intervals of time in the operation of electrical or mechanical devices, said device comprising condensers having charging circuits and discharge circuits, switching means for operating the charging circuits of said condensers during the interval of time to be measured, an adjustable resistance in the charging circuit of one of said condensers for controlling the rate of charge of said condenser, a fixed resistance in the charging circuit of the other of said condensers to permit said condenser to acquire a definite, fixed value of charge and an indicating means in the discharge circuit of said condensers, said indicating means being adapted to indicate whether or not the charge of said first condenser is equal to said definite, fixed value of charge of said second condenser.

5. The method of measuring intervals of time in the operation of electrical or mechanical devices which consists in charging a condenser through a circuit of variable resistance to such charge as it will accumulate during the interval of time to be measured, comparing the electrical condition of the condenser so charged with that of another condenser charged to a known value, successively adjusting the rate of charging of the first condenser and after recharging during the same time interval again comparing its electrical condition with that of the second condenser, continuing this process until a balance is obtained, and then determining the time interval directly from the adjustment of the electrical characteristics of the charging circuit by means of the relation that the time of raising a condenser to a predetermined electrical condition is directly proportional to the resistance of the circuit through which it is charged.

In testimony whereof, I have signed my name to this specification this 20th day of September 1926.

JOSEPH HERMAN.